Nov. 7, 1939.　　V. W. BREITENSTEIN　　2,179,240
METAL DETECTION DEVICE
Filed Jan. 2, 1937　　2 Sheets-Sheet 2
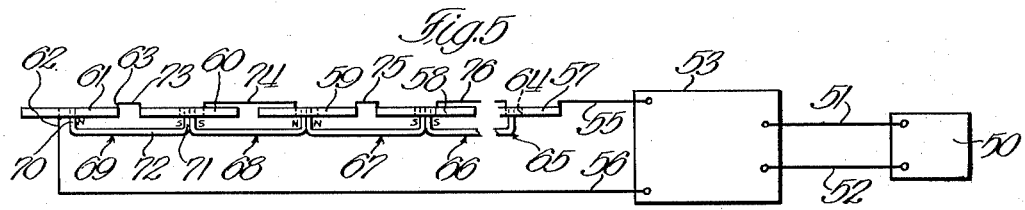
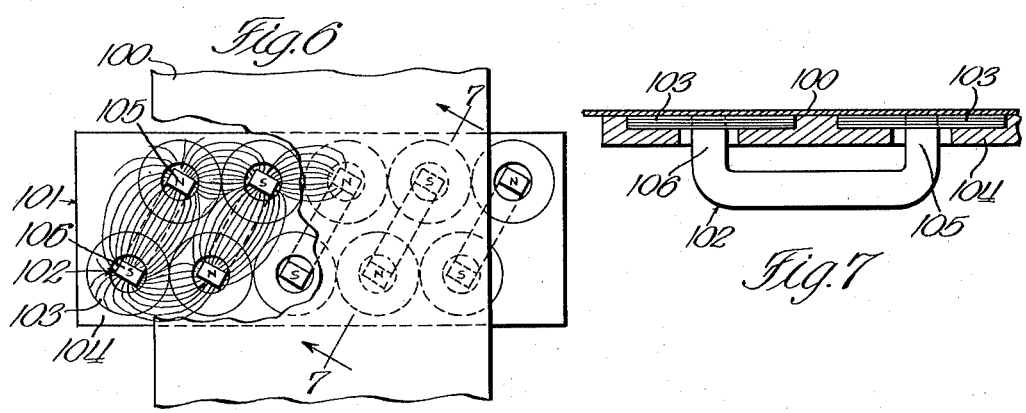
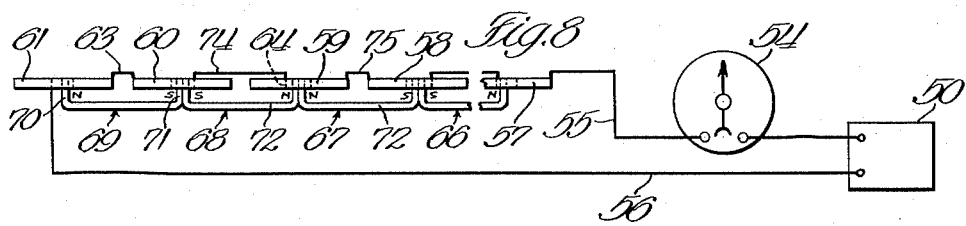
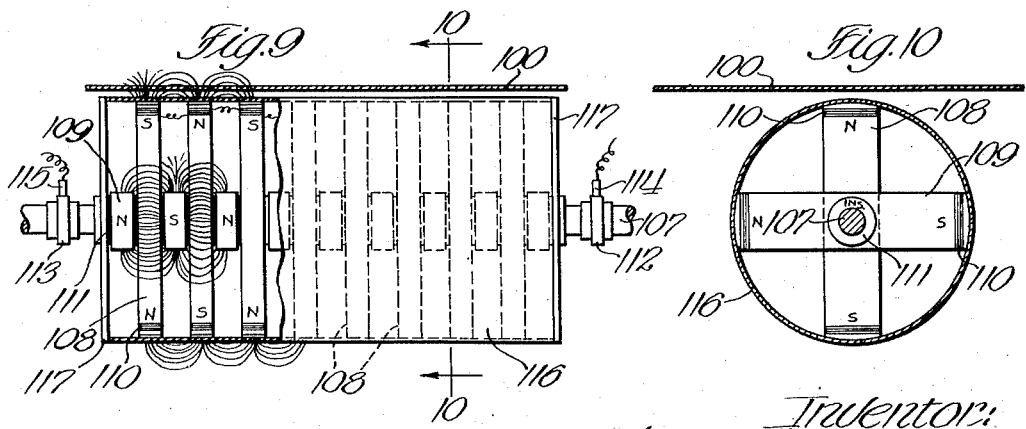
Inventor:
Victor W. Breitenstein
By Williams, Bradbury, McCaleb
& Hinkle
Attys.

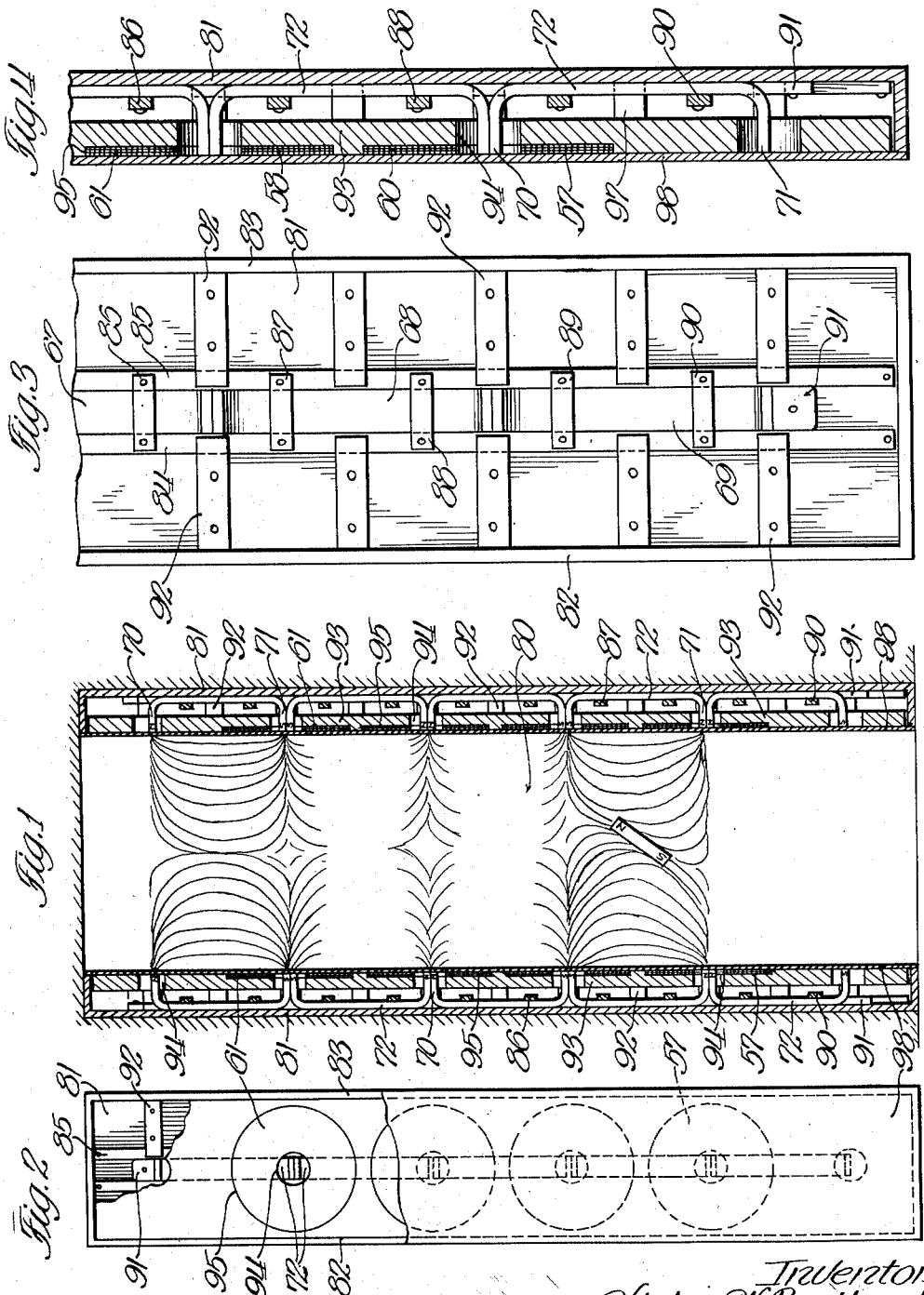

Patented Nov. 7, 1939

2,179,240

UNITED STATES PATENT OFFICE 2,179,240

METAL DETECTION DEVICE

Victor W. Breitenstein, Chicago, Ill., assignor to Illinois Testing Laboratories, Inc., Chicago, Ill., a corporation of Illinois Application January 2, 1937, Serial No. 118,815

4 Claims. (Cl. 177—311)

The present invention relates to metal detection devices, and while it is particularly concerned with devices for detecting the movement, and therefore the presence, of weapons such as guns, knives, or the like, in banks, penal institutions, etc., and tools, such as files, saws, etc., in industrial establishments or penal institutions, the devices described herein have many industrial applications and may be used for detecting the movement and therefore the presence of magnetic metal under many different conditions.

Other uses of the metal detection devices will be described in detail as the description of specific examples of the invention progresses.

One of the objects of the invention is the provision of an improved metal detection system which is characterized by its low power consumption and by the fact that no energy is needed for the energization of the coil system and therefore there is no heating of the coils.

Another object of the invention is the provision of a metal detection system in which the system is balanced against the effects of stray field disturbances, and in which the field of detection may be localized.

Another object of the invention is the provision of an improved metal detection system which is unaffected by the presence of metals which are not in motion, thereby preventing disturbance of the system by the mere proximity of magnetic or other metals not in motion and not carried by the person or article under detection.

Another object is the provision of an improved metal detection system in which there are no currents or voltages to be balanced, and therefore no need for constant re-adjustment to effect this balance as is frequently necessary in the devices of the prior art.

Another object is the provision of an improved metal detection system which is characterized by a stationary balance of its electrical characteristics rather than by the dynamic balance of the voltages or currents or forces impressed on the system.

Another object is the provision of improved forms of metal detection devices capable of supplying the metal detection impulse for numerous forms of industrial applications.

Another object is the provision of an improved metal detection system for traffic control or for the actuation or control of advertising devices, signals, lights, or detection devices responsive to the movement of metal vehicles, in which the devices are controlled solely by the movement of the vehicle in proximity to the localized magnetic field of an electrical metal detection device.

Mechanical devices have been made for actuating electrical switches by mechanical movement, due to the weight of a vehicle, but such devices are frequently deranged because of snow, ice, dust or water, when the springs are made strong enough for actuation by heavy vehicles that are too strong for light vehicles, and vice versa.

Another object of the present invention is the elimination of these difficulties and provision of a metal detection device which works uniformly in spite of snow, ice, dust or water, which has no mechanically moving parts, and which may be sealed with wax or pitch in a solid block, so that there are no hollow spaces, and therefore there can be no condensation of liquid inside the devices.

Another object is the provision of an improved metal detection device in which the instrument may be made accessible for servicing and in which the coils need not be energized, thereby conserving power, and in which the lead wires from the coils carry very low voltages in the nature of microvolts, so that there is never any possibility of a break-down of insulation due to the voltages imposed upon it by the operation of the device.

Other objects and advantages of the invention will be apparent from the following description and the accompanying drawings, in which similar characters of reference indicate similar parts throughout the several views.

Referring to the drawings,

Fig. 1 is a vertical elevational view of the magnets and coils housed in a framework surrounding a doorway, for the purpose of detecting the movement of magnetic metal through the doorway, or within the effective range of the localized field surrounding the doorway, the trim being removed from the door frame to expose the magnets and coils;

Fig. 2 is an elevational view of one edge of the doorway, partially broken away to show the interior structure of the arrangement of Fig. 1;

Fig. 3 is a fragmentary elevational view of the arrangements for supporting the magnets of Fig. 1, with the coils and enclosing cover boards removed;

Fig. 4 is a fragmentary sectional view taken on a plane passing through the axis of the coils, showing the magnets in elevation with their supporting structure;

Fig. 5 is a wiring diagram for a metal detection system, utilizing magnets and coils of the type shown in Figs. 1 to 4;

Fig. 6 is a plan view of a detecting device mounted directly beneath a conveyor belt for industrial use, such as, for example, to show the presence of magnetic metal in candy, carried by the conveyor belt;

Fig. 7 is a side elevational view of the arrangement of Fig. 6;

Fig. 8 is a wiring diagram, similar to that of Fig. 5, illustrating the use of the metal detection system, with an indicator or controlling device that does not require an amplifier;

Fig. 9 is a transverse, sectional view, taken through a magnet and coil arrangement, mounted on a shaft, and adapted to be rotated beneath a conveyor belt of the type of Fig. 6, for the purpose of increasing the electrical effect where the movement of the belt is very slow, by moving the magnets and coils at a predetermined rate of speed;

Fig. 10 is a front elevational view of the rotating coil type of metal detection device of Fig. 9.

Referring to Figs. 1 to 5, these are views of an arrangement for detecting the presence of magnetic metal due to the movement of the metal.

Fig. 5 is a wiring diagram and will, therefore, first be described. In the diagram 50 indicates an electrical indicator which may be a bell, a light, a galvanometer, or any two or all three of these indicators.

The conductors 51, 52 lead to the indicator 50 from the output of the amplifier 53, which may consist of any suitable electronic amplifier for amplifying the relatively weak signals or electrical impulses produced as a result of the movement of the metal, and producing an electrical voltage and current in the device 50 sufficient to produce the indication desired.

In other embodiments of the invention, such as, for example, Fig. 8, the amplifier 53 may be wholly omitted, and a galvanometer 54 may be used, with or without any other indicators, visual or audible.

The input leads 55, 56 from the galvanometer of Fig. 8, or from the amplifier of Fig. 5, are connected to the coils 57—61. The coils 57—61 are without any energization and are preferably similar in their winding, resistance, inductance, and capacity; that is, in their electrical characteristics. Thus, each coil will have a lead 62 from the innermost turn and a lead 63 from the outermost turn. These leads are preferably connected in series and in such a manner that the effects produced in the coils counterbalance each other for each magnet.

The coils 57—62 are preferably flat, pancake type coils, thereby spreading the turns of wires over a greater area and enabling me to cover substantially all of the length of a doorway from the top to the bottom with turns of wire. The substantially even distribution of the turns over the inner area of the door frame facilitates a substantially uniform metal detection effect and sensitivity.

The coils 57—62 are arranged so that each coil (excepting the end coils 57, 62) has its centrally located aperture 64 about the two poles of two adjacent magnets. The detector includes a plurality of magnets 65—69, and the magnets are preferably each provided with the relatively short legs 70, 71 and the relatively long yoke 72.

The length of the yoke 72 bears a direct relation to the width of the doorway, in order to secure a substantially uniform field. In other words, the distance between the ends of the poles on the legs 70, 71 should be greater than half the width of the door-way shown in Fig. 1.

The magnets 65—72 are permanent magnets, and preferably have the legs 70, 71 at right angles to the yoke 72. These permanent magnets are arranged with yokes 72 extending in substantially a straight line, and the like poles of the magnets are adjacent each other. Thus the magnets are alternately reversed in direction, so that the two north poles will always be together and the two south poles will always be together. Otherwise, the tendency would be to decrease the external field of the magnet due to the direct passage of flux from one pole to an opposite pole, if they were in contact with each other.

The coil 62 thus embraces a north pole, while the coil 60 embraces two south poles. The coil 59 embraces two north poles, and the coil 58 two south poles. The outer leads of adjacent coils 60 and 61 are connected together by a conductor 73, and the inner leads of the adjacent coils 60 and 59 are connected together by a conductor 74. Thus the outer leads of two coils 61 and 60 are connected together, and the two coils 60 and 59 have the inner leads connected together, and so on, thereby automatically reversing the connections of the coils. The coils on any one magnet, as, for example, the coils 58, 59 on the poles of the magnet 67, are reversed in direction so that their effects are counter-balanced.

This is a very important feature of the invention, as this counter-balancing of the coils prevents any electrical impulses in the system due to ordinary static. The static from the spark of an opening switch would otherwise produce an electrical impulse, but such static effects are wholly eliminated or reduced by the counter-balanced connections of the coils, and only local effects, due to the distortion of the magnetic field, produced by the magnets 65—69, produce any effective impulse in the coils.

The magnets and coils of Fig. 5 may be arranged in a number of different ways, to effect a detection of metal. For example, only one magnet may be utilized, with its coils so connected when the magnet is to be brought close to the metal to be detected, such as, for example, in the use of a hand operated magnet which is passed over the body of a person suspected of carrying weapons. The local field of the magnet is thus brought into juxtaposition with the locations in which it is suspected that the metal is present, and the movement of the magnet and coils covers a larger area over which detection is desired.

In other embodiments of the invention one or a few magnets may be located to provide a localized field, such as, for example, over the top of a table or a portion of the table over which packages may be passed to determine whether they have in them articles including magnetic metal, such as, for example, weapons.

In every case it should be noted that the balancing of the coils and magnets is a static balance, rather than a dynamic balance, and there is no energization of the coils and no necessity to balance currents or voltages. Thus, there is no possibility of the coils heating up, and the power consumption is low, since power is consumed only by the amplifier when the amplifier is used.

Referring to Figs. 1 to 4, these are illustrations of the preferred mode of securing the magnets and coils in place. The installation of these figures is that which has been used in penal institutions for metal detection with respect to visitors who have come to visit the inmates, and who are compelled to pass through the doorway 80 of Fig. 1.

In this embodiment of the invention the magnets are arranged in a similar manner on both sides of the door opening and extend to a point above the head of any person likely to pass through the doorway, and to a point slightly above the ankles of the person walking through the doorway.

The purpose of keeping the lower magnet above the ankles or shoes of the person passing through the doorway is to prevent the actuation of the signal due to the metal nails which are usually used in shoes, or due to the metal arches or supporting members which may be present in the shoes.

Obviously, in case it were desirable, it would be feasible to extend the magnets all around the doorway, including the top and bottom, if desired; but in the particular installation in question the visitors are watched so that there is no possibility of their removing anything from their shoes, which are not subject to the metal detection, the magnets being arranged on opposite sides of the door in such a manner that the effective field of the right hand magnets extends to about the middle of the door, and that of the left hand magnets to the same point.

The lines which are drawn in a portion of Fig. 1 represent the lines of force from the magnets, and the normal or undisturbed condition of these lines is shown at the top of the figure. At the bottom of the figure there is a representation of the change in the lines of force which takes place when a member of magnetic metal is located in the field. It will be observed that the magnetic lines of force take the path of least resistance and tend to pass through the paramagnetic material, rather than through the air. This produces a concentration of the lines of force wherever the metal member is located.

As practically all weapons, such as knives, guns, etc., are made out of magnetic metal, such as iron or steel, it is possible to produce effective metal detection by merely detecting the presence or movement of magnetic metal. Furthermore, such weapons are usually disposed longitudinally of the body of the person carrying them, in order to conceal them more effectively; that is, a knife will extend along an arm or along the body, and thus present a considerable length vertically of the doorway, which also facilitates more effective detection of the presence of the weapon.

It should be noted that the mere presence of magnetic metal in the doorway does not produce any result so long as the magnetic metal is not moving. Thus, the presence of nails or proximity of other metal objects does not produce any signal as long as these parts are fixed with respect to the coils of the system.

However, in order to produce the most uniform magnetic field, the installation is preferably made by means of non-magnetic metal securing devices, such as brass screws or bolts, and glue is used in securing the parts of lumber together.

When a member of magnetic metal moves through the doorway, the concentration of magnetic lines of force which pass through this metal member move with it. These lines of force then cut the coils which are disposed about the magnetic poles, and in cutting the coils produce an electromotive force which is impressed upon the galvanometer or amplifier and produce a signal, ringing a bell, lighting a lamp, or both.

The metal having been detected upon the body of the person passing through the doorway, it is obvious that there is then valid ground for searching him or her and depriving him of any weapons. The person may then be caused again to pass through the doorway and only permitted to visit the penal institution after the metal detector has indicated the absence of magnetic metal by failure to produce any signal when the person passes through the doorway.

The doorway 80 is preferably arranged between the studs of a partition so as to present the appearance of an ordinary doorway; but, if desired, it may merely consist of a separate frame through which the person is compelled to pass. The magnets and coils are enclosed in a housing, and the housings at each side of the door being identical, only one will be described in detail.

Each housing comprises a lumber board 81, which is provided with the side walls 82, 83, which may also serve as the trim for the doorway. The frame member 81 is provided with a pair of vertically extending wooden strips 84, 85, which are glued to the board 81, and are spaced from each other by an amount which equals the width of the magnets 65—69. Thus these magnets are clamped at their opposite faces by the strips 84, 85.

The strips 84, 85 are of the same thickness as the thickness of the rods or bars of which the magnets are made, and thus the magnets may be clamped to the board 81 by a plurality of wooden cross strips 86—90 (Fig. 3). These strips 86—90 are secured in place by brass screws, with or without glue, and they hold the magnets in the groove which is provided between the strips 84, 85.

The magnets being rectangular in cross section, they have flat outer surfaces which engage flatly against the board 81 and the strips 84, 85 and 86—90. Each end magnet 69 or 65 is also engaged by a wooden block 91, which is disposed between the strips 84, 85 and engages the endmost leg of the magnet. Since the magnets are forced gainst each other and there is a block at each end, they are securely confined in between the blocks and strips.

It is of the utmost importance that there should be no movement of the magnets with respect to the coils or of the coils with respect to the magnets. It is also desirable that there should be no movement of the coils and magnets with respect to the doorway, as otherwise a signal might be produced, due to the proximity of magnetic bodies which are not moving, but due to the movement of the system.

The wooden strips 84, 85 may also be further secured in place by a plurality of strips 92, which have cut-out portions for engagement with the stips 84, 85. These strips 92 may be pushed over against the strips 84 or 85 and screwed down with brass screws in such a manner that the portion over-lying the strips 84 or 85 effectively clamps those strips down to the board 81 and the shoulder at the end of the strip 92 forces the strip 85 over against the magnets.

The housing also includes a relatively thick wooden board 93, which fits in the open face of the box, and is provided with a plurality of apertures 94, suitably located to embrace the legs of the magnets.

Each of the apertures 94 also has a relatively shallow counterbore 95 communicating with it on the outer or face side of the board 93, and adapted to receive the pancake coils 57—61. These coils are of substantially disc shape, with a centrally located aperture for receiving the magnetic legs, and the coils are built up so that they fit tightly within the bores 95 and are flush with the outer surface of the board 93.

The board 93 is also secured in place by suitable screws, and supported by suitable spacing blocks 97, and the complete assembly is then covered by a board 98 of thin strong lumber, such as, for example, plywood, which covers all of the magnets, coils, etc., completes the housing, and secures the coils 57—61 in the sockets 95.

Various other modes of securing magnets and coils in fixed position may also be used, but the foregoing is a preferred and effective method of making an installation.

The foregoing installation may be used not only in penal institutions, but in factories and other industrial establishments, to detect the pressure of tools carried by workers. There is a considerable loss of tools due to theft by workers, and this can be wholly eliminated by the use of such a metal detector, which would cause a bell to ring or light to light when the worker passes through the doorway on his way out of the factory with a tool on his person.

Various other uses of the invention may be made, and I do not wish to confine myself to the particular examples given.

Referring to Fig. 6, this is a diagrammatic illustration of another form of the invention which may be used for detecting the presence of magnetic metal by virtue of its movement in solid, granular or other material, which might be carried upon a conveyor belt.

In this embodiment 100 indicates the conveyor belt, which passes above a metal detection unit 101, provided with a plurality of magnets 102, having suitable coils 103. The magnets and coils are fixedly secured to the supporting member 104, and are preferably arranged with the opposite legs 105, 106 offset or staggered with respect to each other in a direction transverse to the direction of movement of the belt.

The belt 100 may move upward or downward in the figure, carrying material across the magnets 102, which are shown in plan, with their pole pieces projecting upward.

The magnets are arranged at an angle of substantially sixty degrees to the direction of motion of the belt, and by means of this arrangement and a close spacing of the pole pieces or legs of the magnet, it is found that an intense or localized field may be produced above the belt, which will produce an impulse, due to the presence of very small pieces of metal, such as, for example, a piece of a needle or a nail, or any other small piece of metal.

The invention is of particular application in connection with the detection of metal in candy, as the presence of a small particle or piece of metal in candy is frequently the occasion for a damage suit against the candy manufacturer. When the metal detection unit, combined with or without an amplifier and an indicator, gives a suitable signal, then that batch of candy is taken out and either thrown away or worked over to find the metal particle, thereby eliminating the possibility of any metal in the finished product.

It should be noted that the area of the coils 103 is such as to practically occupy all of the space available between adjacent magnets, so that the coils are almost touching, or, being insulated, they may touch each other. Also, the coils are connected as described with respect to Fig. 5, in such manner as to effect a counter-balance of the coils on each magnet.

In such industrial applications, I prefer to have the metal detection unit also control the operation of the machinery, such as the conveyor belt, so that when metal is detected the belt stops automatically.

It will be apparent from Fig. 6 that no object of magnetic metal could pass upward or downward on the figure, that is, horizontally across the magnets, without the lines of force, which are attracted to the object, cutting some of the coils of the magnets. The cutting of the coils by the lines of force takes place in three ways: First, the lines of flux cut the coils when they, in effect, jump from their normal position to the metal object. Second, the lines of force cut the coils when they move with the metal object across the coils. Third, they again cut the coils when the metal object passes out of the range of a certain line of force and the line jumps back to its normal position, away from the piece of magnetic metal.

It is, of course, understood that the action of the lines of magnetic force is that of a tension along the line and a repulsion transverse to the lines.

In some embodiments of the invention it will be found that the belt 100 moves so slowly that it is desirable to use other means to produce relative movement between the magnets and/or coils and the metal object which might be upon the belt in some commodity being transported on the conveyor belt.

In such case, an installation of the type of Figs. 9 and 10 will be useful. In this embodiment, there is a shaft 107 suitably supported in bearings for rotation about an axis which is parallel to the belt 100. The shaft may support a plurality of bar magnets 108, 109, the bar magnets being arranged at right angles to each other and being provided at each outer end with the coils 110.

Here again the coils should be connected so as to be balanced on each magnet and so that any static effects will be balanced out, as shown in Fig. 5. The coils are fixedly supported on the magnets, and the magnets fixedly clamped on the shaft 107 by suitable threaded members, with fiber washers 111 between the magnets so as to effect a clamping of the magnets without placing any such strain on the magnets as is likely to affect the magnetization.

The coils may all be connected in series, and a lead brought out at each end to a slip ring 112, 113, which is slidably engaged by a brush 114, 115, and connected to the amplifier or indicator.

The complete assembly may be enclosed in a non-magnetic cylinder 116, with non-magnetic end plates 117, such as a brass cylinder and brass end plates. This cylinder with its magnets may then be rotated at a constant rate of speed, thereby producing a rotating magnetic field, which in a similar manner is caused to be distorted by the presence of magnetic metal on the belt 100, which causes magnetic lines of force to cut the coils and product electrical impulses.

The resulting electromotive force will be alternating, and its frequency will depend upon the speed of rotation of the cylinder.

The polarity of the bar magnets or location of the poles should be as indicated on the sketch, so that the lines of flux extend from the end of each bar magnet to an opposite and adjacent pole on an adjacent bar magnet. For example, the cylinder may rotate at such a speed as to give 25 to 900 cycles per second. 25 cycles per second would require a rotation of 12½ revolutions per second.

It will thus be observed that I have invented an improved metal detection system and a multiplicity of industrial and other applications of metal detection units of improved characteristics.

My metal detection system is characterized by a lack of heating of the coils, since there is no energy needed for the coil system, and by low power consumption, since power is only required for the amplifier where an amplifier is used. The system is balanced against stray field disturbances and is unaffected by the presence of metals not in motion. There are no currents or voltages to be balanced, and therefore no need for constant readjustment to preserve the balance. It is characterized by a stationary balance rather than a dynamic balance of currents or voltages.

So far as I am aware, prior to my invention there were no metal detection devices which were capable of eliminating the disturbances caused by static charges, distortion of the earth's magnetic field by heavy moving metal bodies, and electromagnetic waves sent out by D. C. machinery. The electromagnetic waves, for example, sent out by the starting or change of energization of a street car motor produced such electrical impulses in the prior art devices that false signals were caused and effective detection was impossible. Such a disturbance might be felt over a distance of half a mile.

It should be noted that where the coils of my system are stationary the device is primarily adapted for the detection of ferrous metals; where the coils are arranged for rotation the devices are adapted for the detection of the presence of any metal due to the action of eddy currents.

While I have illustrated a preferred embodiment of my invention, many modifications may be made without departing rfom the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a device for detecting a movement of magnetic metal, the combination of a permanent magnet with a pair of coils, said coils being located to embrace parts of said permanent magnet, and being oppositely connected so that the electromotive forces generated in said coils by stray magnetic effects from sources other than said permanent magnet will be counter-balanced, said coils being relatively flat and wide in shape for the purpose of augmenting the electromotive force induced in said coils by movement of a magnetic body moving in said field.

2. In a device for detecting a movement of magnetic metal, the combination of a permanent magnet with a pair of coils, said coils being located to embrace parts of said permanent magnet and being oppositely connected so that the electromotive forces generated in said coils by stray magnetic effects from sources other than said permanent magnet will be counterbalanced, said coils being relatively flat and wide in shape for the purpose of augmenting the electromotive force induced in said coils by movement of a magnetic body moving in said field, and said coils being located adjacent the poles of said permanent magnet.

3. In a metal detection system, the combination of a directive non-magnetic frame for directing the course of movement of the subject-matter of test in a predetermined test space, with a plurality of permanent magnets carried in spaced relation to each other by said frame and having pole pieces located about the frame in such manner as to provide a substantially uniform magnetic field in said test space within said directive frame, a plurality of insulated wire coils carried by said frame and having the conductors of said coils substantially uniformly distributed along a boundary of said frame, said coils and magnets being fixedly secured against motion relative to each other, whereby any movement of a body of magnetic metal in said space causes a movement of lines of force of said magnetic field and a cutting of conductors of said coils and induction of an electromotive force of predetermined intensity in said coils, and means for causing an indication of the presence of a body of magnetic material in the subject-matter of the test controlled by said electromotive force, said magnets being provided with relatively short legs and long yokes, and having similar poles of adjacent magnets, adjacent each other, said coils embracing both said poles, and said coils being of pancake form, similarly constructed and adjacent coils being oppositely connected in series.

4. In a metal detection system, the combination of a directive non-magnetic frame for directing the course of movement of the subject-matter of test in a predetermined test space, with a plurality of permanent magnets carried in spaced relation to each other by said frame and having pole pieces located about the frame in such manner as to provide a substantially uniform magnetic field in said test space within said directive frame, a plurality of insulated wire coils carried by said frame and having the conductors of said coils substantially uniformly distributed along a boundary of said frame, said coils and magnets being fixedly secured against motion relative to each other, whereby any movement of a body of magnetic body in said space causes a movement of lines of force of said magnetic field and a cutting of conductors of said coils and induction of an electromotive force of predetermined intensity in said coils, comprising amplifying means for amplifying induced electromotive forces and controlling a current source for actuating a signal, said magnets being provided with relatively short legs and long yokes, and having similar poles of adjacent magnets, adjacent each other, said coils embracing both said poles, and said coils being of pancake form, similarly constructed and adjacent coils being oppositely connected in series.

VICTOR W. BREITENSTEIN.